Oct. 4, 1960     E. E. COULTER     2,954,842

METHOD AND APPARATUS FOR SEPARATING VAPOR AND LIQUIDS

Filed July 6, 1956

INVENTOR.
Earl E. Coulter

BY

*[signature]*

ATTORNEY

United States Patent Office 2,954,842
Patented Oct. 4, 1960

2,954,842
METHOD AND APPARATUS FOR SEPARATING VAPOR AND LIQUIDS

Earl E. Coulter, Alliance, Ohio, assignor to The Babcock & Wilcox Company, New York, N.Y., a corporation of New Jersey Filed July 6, 1956, Ser. No. 596,275

3 Claims. (Cl. 183—79)

This invention relates in general to the construction and operation of gas and liquid separators, and more particularly, to separating a mixture of liquid and its vapor into components by centrifugal force.

Centrifugal separators augment the force tending to separate vapor from liquid by subjecting a stream of vapor-liquid mixture to whirling in which centrifugal force forces the heavy liquid to the outer periphery where it is removed by gravity while the lighter vapor passes upward in the center of the whirling stream. These separators whirl the stream 360° or more to effect the separation. Studies of the action within the separator show that after 180° of angular whirl the flow stream begins to mix with the prior whirling and the flow becomes somewhat confused. It therefore appears that the major portion of separation occurs in the first 180° of whirl. I have determined that a second factor is important in centrifugal separation and that is to maintain the thickness of the whirling stream slightly beyond the thickness of vapor bubbles entrained therein, as this reduces the distance which the vapor has to travel in order to become separated.

Accordingly, my invention involves forming a vapor-liquid mixture into a thin stream and subjecting the stream to centrifugal force during an angular change of direction of less than 180° to effect separation of vapor from a mixture of liquid and vapor simply and effectively.

Further, I provide an apparatus for carrying out the method which involves nested curvilinear smooth plates defining a curved passage therebetween with each plate curved in one direction an angle of less than 180°.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
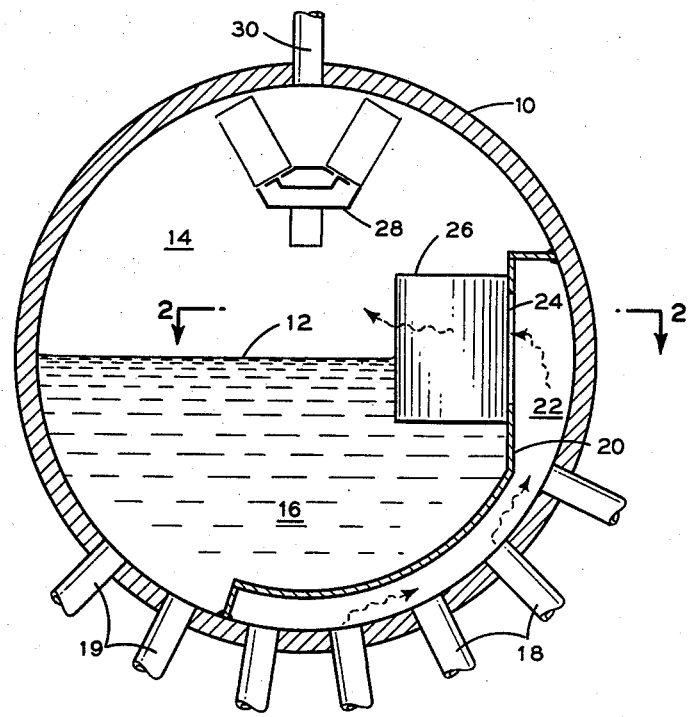
Fig. 1 is a vertical section through a vapor-liquid drum embodying the present invention.
Figure 2:
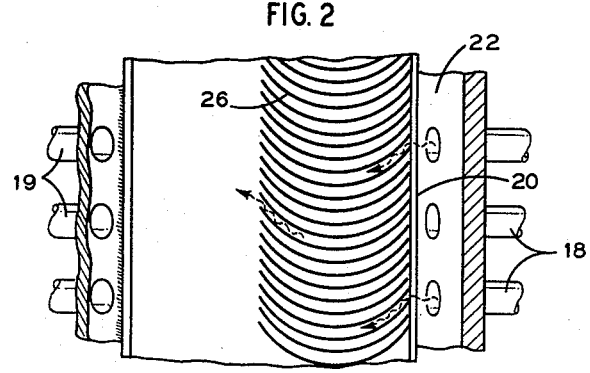
Fig. 2 is a partial plan section of Fig. 1 taken along the lines 2—2.

A vapor-liquid drum 10 is arranged with a liquid level 12 separating an upper vapor space 14 from a lower liquid space 16. Riser tubes 18 discharge a vapor-liquid mixture into the drum and downcomer tubes 19 carry away liquid therefrom. Arranged interiorly of the drum is the baffle 20 which longitudinally divides the drum and simultaneously forms a vapor-liquid mixture inlet chamber 22 which is adapted to receive a vapor-liquid mixture from the riser tubes 18. There is a longitudinal slot 24 constituting an outlet in the baffle 20. Disposed across the outlet 24 are a multiplicity of curvilinear plates 26 which are nested, i.e. placed one within the other, and closely spaced to divide the flowing vapor-liquid mixture into a multiplicity of thin streams. Each of these curvilinear plates are preferably a segment of a cylinder but may be of any curvature which will subject the thin vapor-liquid streams to a centrifugal force through a change of direction of preferably greater than 90° and less than 180° angular. The distance between these plates should preferably be slightly greater than the entrained vapor bubble size and in no event be greater than the depth of the curve of the plate. One half (½) of an inch would be the preferred spacing for a steam-water separator at 1,000 p.s.i.a. The range of spacing should be one quarter (¼) to one (1) inch depending upon the stream pressure. The construction illustrated involves plates formed into a segment of a cylinder having a six (6) inch radius and constituting an arc of 120°. The plate spacing being one-half (½) inch. The height of the plate is eighteen (18) inches.

The thin streams of vapor-liquid mixture which are formed by the multiplicity of plates 26 are subjected to centrifugal force by the curvature of the plates, thus augmenting the natural forces tending to separate the mixture into its two components. The vapor upon issuing from the plates will be directed upwardly into the vapor space 14 of the drum 10 with the liquid falling into the liquid space 16.

The separating plates 26 perform the majority of separation but the final amount of moisture carried by the vapor is removed in a vapor scrubbing apparatus 28 arranged across the vapor outlet 30 from the drum. The scrubbing apparatus would preferably be composed of closely spaced corrugated elements constructed and arranged somewhat as in the patent to Fletcher 2,007,966, July 16, 1935. These elements remove the last particles of liquid which are carried by the separated vapor so that dry vapor is delivered to the outlet 30.

The present invention utilizes the principle of centrifugal force and proper geometry to accomplish the separation by dividing the vapor-liquid stream into a thin sheet of a slightly greater thickness than of the diameter of the entrained vapor bubbles and subjects this stream to an angular change of direction of greater than 90° and less than 180°. During which period the centrifugal force accelerates the natural gravitational separating forces. Thus there is produced a compact and extremely simple vapor-liquid separator which combines the good characteristics of the prior art separator and creates a geometrical shape of the stream which is conducive to good separation.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features. While the invention has been specifically described as used for separating vapor from a liquid it is equally adapted for separating gases from liquid such as natural gas from gasoline or air from water.

What is claimed is:

1. In a vapor-liquid separating apparatus, a drum having a liquid level separating an upper vapor space from a lower liquid space, means forming a vapor offtake from said vapor space, means forming a vapor-liquid mixture collection chamber within said drum and having a vapor-liquid mixture outlet adjacent said liquid level, vapor-liquid separating means consisting of a multiplicity of upright nested curvilinear smooth uniform thickness plates having smooth exit ends and arranged to define vertical narrow curved passages therebetween from the outlet of said vapor-liquid collection chamber to said vapor and liquid spaces, the passages between the plates being directly in communication with said liquid and vapor spaces and each of said plates curved in one direction an angle of greater than 90 degrees and less than 180 degrees.

2. In a vapor-liquid separating apparatus, a drum having a liquid level separating an upper vapor space from a lower liquid space, means forming a vapor offtake from said vapor space, means forming a vapor-liquid mixture collection chamber within said drum and having a vapor-liquid mixture outlet adjacent said liquid level, vapor-liquid separating means consisting of a multiplicity of upright nested curvilinear smooth uniform thickness plates having smooth exit ends and arranged to define vertical narrow curved passages therebetween from the outlet of said vapor-liquid collection chamber to said vapor and liquid spaces, the passages between the plates being directly in communication with said liquid and vapor spaces and each of said plates curved in one direction an angle of greater than 90 degrees and less than 180 degrees and spaced from the adjacent plate a distance no greater than the depth of the curve.

3. In a vapor-liquid separating apparatus, a drum having a liquid level separating an upper vapor space from a lower liquid space, means forming a vapor offtake from said vapor space, means forming a vapor-liquid mixture collection chamber within said drum and having a vapor-liquid mixture outlet adjacent said liquid level, vapor-liquid separating means consisting of a multiplicity of upright nested curvilinear smooth uniform thickness plates having smooth exit ends and arranged to define vertical narrow curved passages therebetween from the outlet of said vapor-liquid collection chamber to said vapor and liquid spaces, the passages between the plates being directly in communication with said liquid and vapor spaces and each of said plates curved in one direction an angle of greater than 90 degrees and less than 180 degrees and spaced from the adjacent plate a distance no greater than the depth of the curve, and said passage being several times longer in length than in width.

References Cited in the file of this patent
UNITED STATES PATENTS

| | | |
|---|---|---|
| 1,007,289 | Jeffreys | Oct. 31, 1911 |
| 1,044,208 | Luhn | Nov. 12, 1912 |
| 1,519,428 | Wilisch | Dec. 16, 1924 |
| 1,879,107 | Couch | Sept. 27, 1932 |
| 2,434,637 | Brister | Jan. 20, 1948 |

FOREIGN PATENTS

| | | |
|---|---|---|
| 255,292 | Germany | Jan. 4, 1913 |
| 773,786 | France | Sept. 10, 1934 |
| 1,105,213 | France | June 29, 1955 |